United States Patent
Lambert et al.

(10) Patent No.: US 10,638,313 B2
(45) Date of Patent: Apr. 28, 2020

(54) SYSTEMS AND METHODS FOR CONFIRMING A CRYPTOGRAPHIC KEY

(71) Applicant: Robert Bosch GmbH, Stuttgart (DE)

(72) Inventors: Robert J. Lambert, Cambridge (CA); Robert M. Kaster, White Lake, MI (US)

(73) Assignee: Robert Bosch GmbH, Stuttgart (DE)

(*) Notice: Subject to any disclaimer, the term of this patent is extended or adjusted under 35 U.S.C. 154(b) by 202 days.

(21) Appl. No.: 15/794,892

(22) Filed: Oct. 26, 2017

(65) Prior Publication Data

US 2019/0132123 A1 May 2, 2019

(51) Int. Cl.
| | | |
|---|---|---|
| *H04W 12/04* | (2009.01) | |
| *H04L 9/08* | (2006.01) | |
| *H04L 9/32* | (2006.01) | |
| *G06F 21/86* | (2013.01) | |
| *G06F 21/72* | (2013.01) | |
| *H04L 29/06* | (2006.01) | |

(52) U.S. Cl.
CPC .......... *H04W 12/04* (2013.01); *G06F 21/72* (2013.01); *G06F 21/86* (2013.01); *H04L 9/0866* (2013.01); *H04L 9/3234* (2013.01); *H04L 9/3242* (2013.01); *H04L 9/3247* (2013.01); *H04L 9/3263* (2013.01); *H04L 63/06* (2013.01)

(58) Field of Classification Search
CPC . H04L 9/0861; H04L 63/123; H04L 63/0442; H04L 63/06; H04L 9/0866; H04L 9/3242; H04L 9/3247; H04L 9/3234; H04L 9/3263; H04L 9/08; G06F 21/72; H04W 12/04
See application file for complete search history.

(56) References Cited

U.S. PATENT DOCUMENTS

| | | | |
|---|---|---|---|
| 8,014,530 B2* | 9/2011 | Brickell | G09C 1/00 380/281 |
| 9,141,769 B1* | 9/2015 | Hitchcock | H04L 9/14 |
| 9,281,942 B2 | 3/2016 | Leboeuf et al. | |
| 9,288,048 B2 | 3/2016 | Han et al. | |
| 9,397,828 B1* | 7/2016 | Lieber | H04L 9/083 |
| 2004/0025010 A1* | 2/2004 | Azema | G06F 21/10 713/156 |

(Continued)

FOREIGN PATENT DOCUMENTS

WO   2017060740 A1   4/2017

*Primary Examiner* — Theodore C Parsons
*Assistant Examiner* — Thomas Ho
(74) *Attorney, Agent, or Firm* — Michael Best & Friedrich LLP

(57) ABSTRACT

Systems and methods for confirming a cryptographic key. The system includes an electronic controller configured to generate an electronic message in response to an installation of a secret key on the electronic controller, the electronic message comprising information about the installation of the secret key, digitally sign the electronic message using a manufacturer private key, encrypt the electronic message, store the electronic message in a memory, access the stored electronic message in response to a request by a user, decrypt the electronic message, confirm a digital signature of the electronic message using a manufacturer public key, generate a confirmation message, and send the confirmation message to a user.

20 Claims, 3 Drawing Sheets

(56) References Cited

U.S. PATENT DOCUMENTS

| | | | |
|---|---|---|---|
| 2005/0005098 A1* | 1/2005 | Michaelis | G06F 21/121 |
| | | | 713/156 |
| 2005/0097348 A1 | 5/2005 | Jakubowski et al. | |
| 2005/0138387 A1* | 6/2005 | Lam | G06F 21/123 |
| | | | 713/185 |
| 2006/0277415 A1* | 12/2006 | Staring | G06F 21/10 |
| | | | 713/193 |
| 2007/0235517 A1* | 10/2007 | O'Connor | G06Q 10/06 |
| | | | 235/375 |
| 2012/0144198 A1* | 6/2012 | Har | H04L 63/0869 |
| | | | 713/170 |
| 2014/0043059 A1* | 2/2014 | Speers | H03K 19/003 |
| | | | 326/9 |
| 2016/0099806 A1 | 4/2016 | Racklyeft et al. | |
| 2016/0205080 A1 | 7/2016 | Abdallah et al. | |
| 2016/0381055 A1 | 12/2016 | Galula et al. | |
| 2017/0012774 A1 | 1/2017 | Antoni et al. | |
| 2017/0142123 A1 | 5/2017 | Komano et al. | |

\* cited by examiner

SYSTEMS AND METHODS FOR CONFIRMING A CRYPTOGRAPHIC KEY

FIELD

Embodiments relate to systems and methods for confirming a cryptographic key.

SUMMARY

When electronic controllers are manufactured, a manufacturer may install a secret key that protects communications and secures the operation of the electronic controller. During the installation process, the manufacturer may generate messages that must be received by the electronic controller in order to continue on from certain points in the installation process. The electronic controller may respond with a set of response messages that indicate an installation status, the secret key values or elements, and the like. Security-conscious purchasers of these electronic controllers may not want this valuable security information stored on a computer system owned by the manufacturer, and would prefer to have the response messages stored on the purchased electronic controller. However, by storing the response messages on the electronic controller, the manufacturer loses the ability to manage the integrity of the response messages, which may contain installation information that can prove valuable if a purchaser returns with a claim that the electronic controller was manufactured improperly or the installation of the secret key was performed incorrectly. Thus, manufacturers and purchasers require a means for both storing the response messages on the electronic controller and guaranteeing the validity and integrity of the stored response messages.

Accordingly, embodiments provided herein disclose, among other things, systems and methods for confirming a cryptographic key.

One embodiment provides a system for confirming a cryptographic key. The system comprises an electronic controller configured to generate an electronic message in response to an installation of a secret key on the electronic controller, the electronic message comprising information about the installation of the secret key, digitally sign the electronic message using a manufacturer private key, encrypt the electronic message, store the electronic message in a memory, access the stored electronic message in response to a request by a user, decrypt the electronic message, confirm a digital signature of the electronic message using a manufacturer public key, generate a confirmation message, and send the confirmation message to a user.

Another embodiment provides a method for confirming a cryptographic key. The method comprises installing, on an electronic controller, a secret key; generating, with the electronic controller, an electronic message comprising information regarding the installation of the secret key on the electronic controller; digitally signing, with the electronic controller, the electronic message using a manufacturer private key; encrypting, with the electronic controller, the electronic message; storing, with the electronic controller, the electronic message in a memory; accessing, with the electronic controller, the electronic message from the memory in response to an input by a user; decrypting, with the electronic controller, the electronic message; confirming, with the electronic controller, a digital signature of the electronic message using a manufacturer public key; generating, with the electronic controller, a confirmation message, and sending, with the electronic controller, the confirmation message to a user.

Other aspects, features, and embodiments will become apparent by consideration of the detailed description and accompanying drawings.

DETAILED DESCRIPTION

Before any embodiments are explained in detail, it is to be understood that this disclosure is not intended to be limited in its application to the details of construction and the arrangement of components set forth in the following description or illustrated in the following drawings. Embodiments are capable of other configurations and of being practiced or of being carried out in various ways.

A plurality of hardware and software based devices, as well as a plurality of different structural components may be used to implement various embodiments. In addition, embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable medium) executable by one or more processors. For example, "control units" and "controllers" described in the specification can include one or more electronic processors, one or more memory modules including non-transitory computer-readable medium, one or more input/output interfaces, one or more application specific integrated circuits (ASICs), and various connections (for example, a system bus) connecting the various components.

Figure 1:
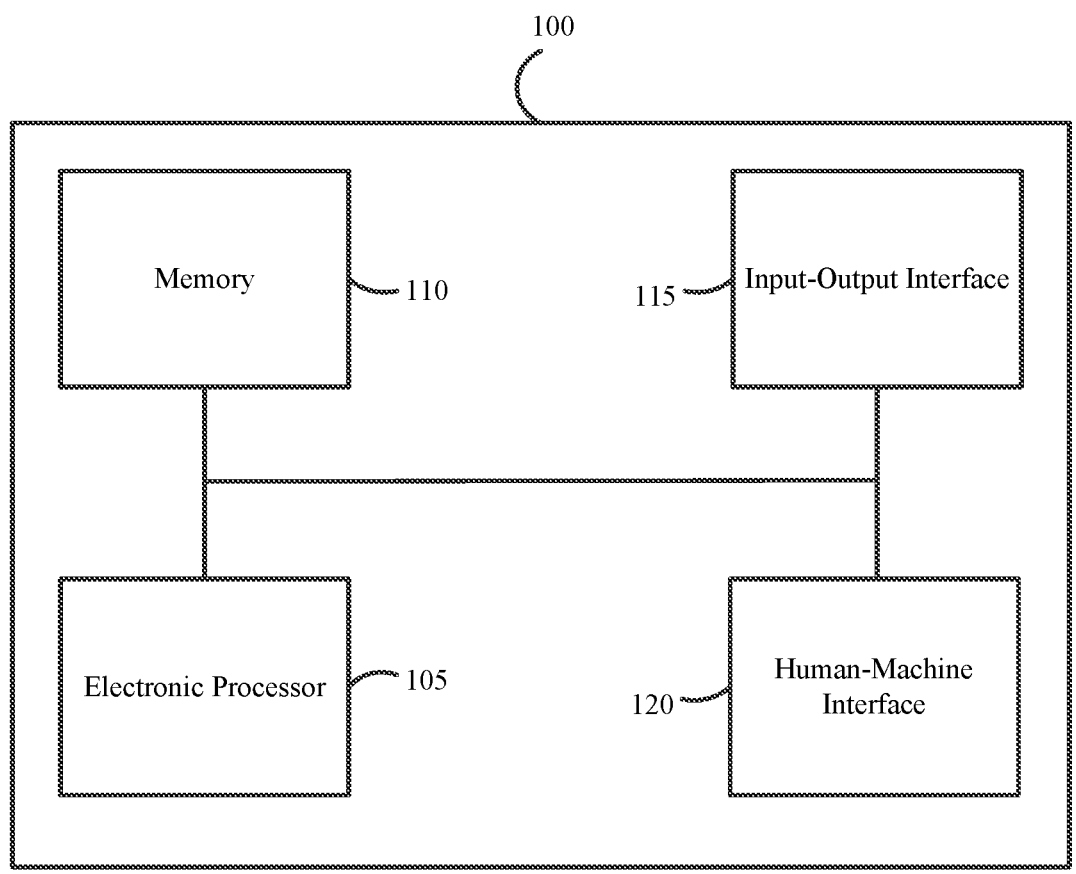
FIG. 1 illustrates an electronic controller according to one embodiment.

FIG. 1 illustrates an electronic controller 100 according to one embodiment. The electronic controller 100 includes an electronic processor 105, a memory 110, an input-output interface 115, and a human-machine interface (HMI) 120. The electronic processor 105, memory 110, input-output interface 115, and HMI 120 communicate over one or more communication lines or buses, wirelessly, or a combination thereof. In some embodiments, the electronic controller 100 includes additional components than those illustrated in FIG. 1 and the components included in the electronic controller 100 may be arranged in various configurations.

The electronic processor 105 may be a microprocessor, an application-specific integrated circuit (ASIC), or another suitable electronic device. In one example, the electronic processor 105 is configured to retrieve data and instructions from the memory 110 and execute, among other things, software related to the processes and methods described herein. The memory 110 includes a non-transitory, computer-readable storage medium.

The input-output interface 115 may be a wireless transceiver, a modem, and the like. The input-output interface is generally configured to receive input from hardware components external from the electronic controller 100 or from other computing systems and provide output from the electronic controller 100 to external hardware components or other computing systems.

The HMI 120 may include a display screen, a touchscreen, and similar components. The electronic processor 105 may, for example, execute instructions that generate a graphical user interface on a display screen. In general, the HMI 120 allows for a user to interact with the electronic controller 100, for example either directly through a screen or by one or more other peripheral components or via an external computing system to the electronic controller 100.

Figure 2:
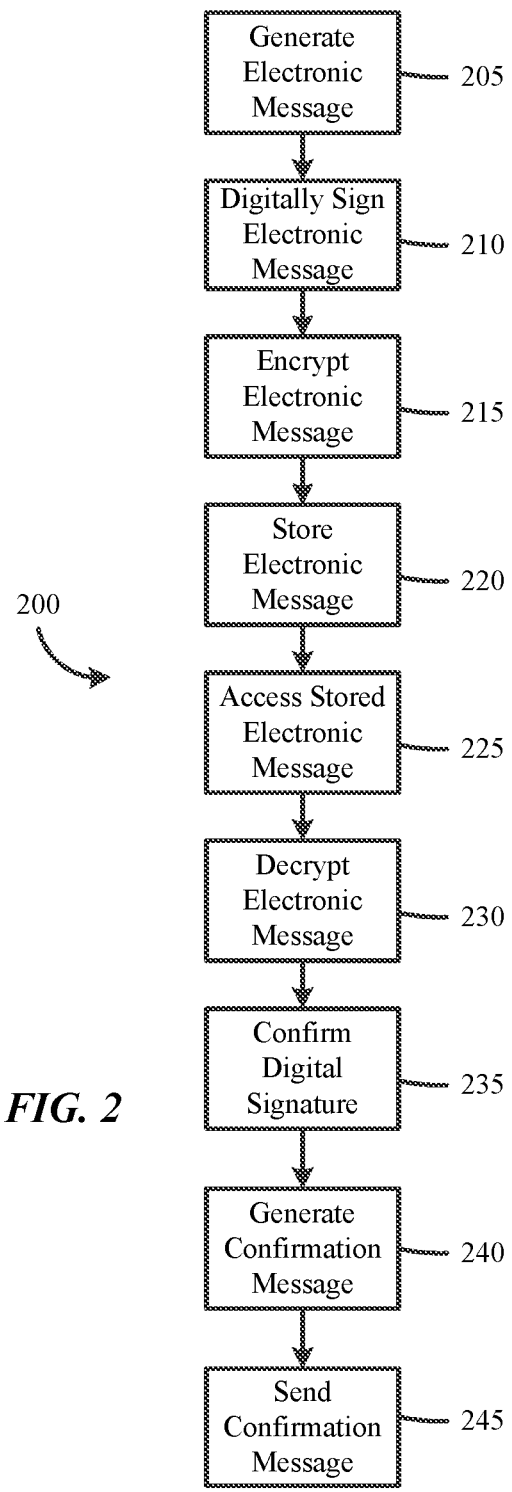
FIG. 2 is a flowchart of a method for confirming a cryptographic key according to one embodiment.

FIG. 2 is a flowchart of a method 200 for confirming a cryptographic key according to one embodiment. The method 200 is performed by the electronic controller 100 and may further utilize external computing systems in some embodiments.

The electronic controller 100 generates a first electronic message in response to an installation of a secret key on the electronic controller 100 at block 205 of method 200. The electronic message generated by the electronic controller 100 includes information about the installation of the secret key, such as date and time of installation, version of the secret key installed, a target unique identifier (UID), a serial number, accounting information linking the electronic controller 100 to production parts, and the like. The electronic message also includes a notification indicating the status of the installation of the secret key. For example, in one embodiment, the notification indicates that the secret key was correctly and successfully installed, including response messages generated by the electronic controller 100 in which the secret key was installed. In another embodiment, the notification indicates a fault or a failure in the installation process.

Figure 3:
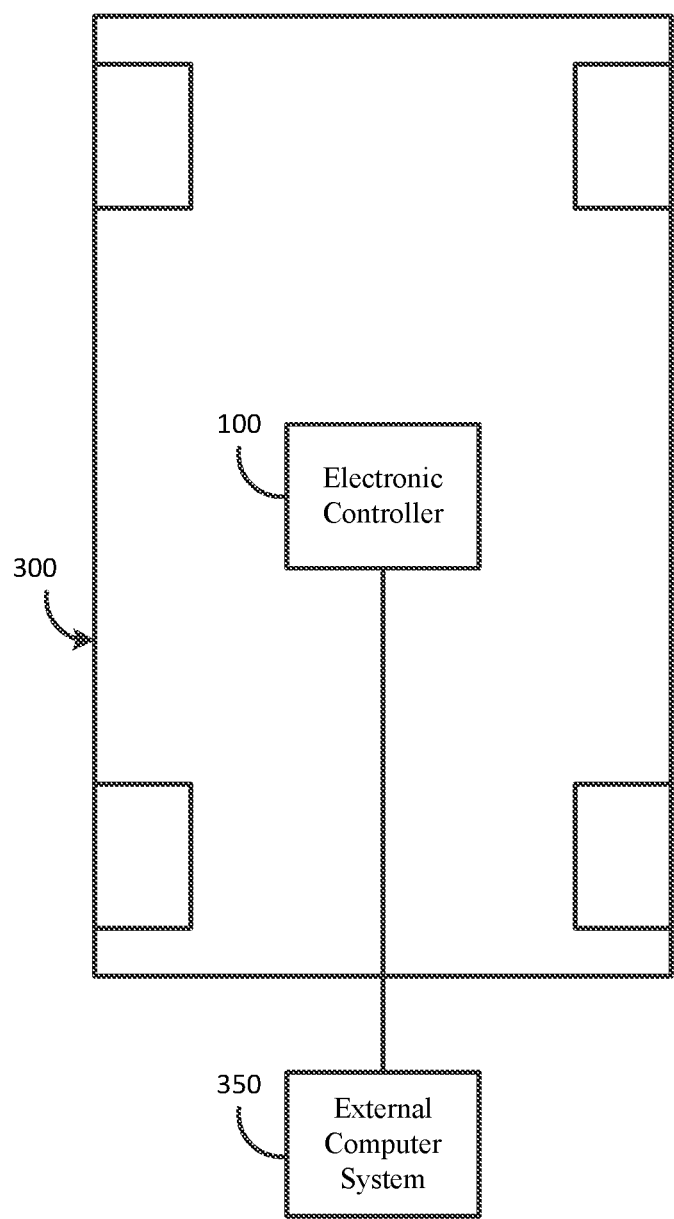
FIG. 3 illustrates a vehicle according to one embodiment.

In one embodiment, the installation or loading of the secret key onto the electronic controller 100 is performed during the manufacture of a vehicle. For example, FIG. 3 illustrates a vehicle 300. The electronic controller 100 is installed in the vehicle 300 with during manufacture. The secret key is loaded into the electronic controller 100 prior to the electronic controller 100 being placed in the vehicle 300. In another embodiment, such as the one shown in FIG. 3, the secret key is loaded on the electronic controller 100 after the electronic controller 100 is installed in the vehicle 300 by connecting an external computer system 350 to the input-output interface 115 and installing the secret key from the external computer system 350.

Returning to FIG. 2, the electronic controller 100 further generates an authentication electronic message, in some embodiments. The authentication electronic message generated by the electronic controller 100 includes a message authentication code that further verifies the information included with the electronic message generated at block 205. In some embodiments, the electronic message and the authentication electronic message are included in the same electronic message. In other embodiments, the electronic message and the authentication electronic message are different electronic messages.

The electronic controller 100 digitally signs the electronic message at block 210. The electronic controller 100 digitally signs the electronic message by using a private key associated with a manufacturer of the electronic controller 100. By digitally signing the electronic message, the electronic controller 100 adds a value to the information associated with the electronic message, adds new data to the electronic message, or the like. A digital signature is created when the electronic controller 100 digitally signs the electronic message. The digital signature is readable by an electronic controller, such as the electronic controller 100 or an electronic controller of an external computing system. In some embodiments, the digital signature is part of a larger digital certificate that is able to be signed by a Certificate Authority.

After digitally signing the electronic message, the electronic controller 100 encrypts the electronic message at block 215. In some embodiments, the electronic controller 100 uses a public key of a purchaser of the electronic controller 100 in order to encrypt the electronic message. This allows the purchaser to keep the messages safely encrypted and does not allow for the manufacturer of the electronic controller 100 to manipulate the electronic message after installation of the secret key on the electronic controller 100.

The electronic controller 100 then stores the encrypted electronic message in a memory at block 220. In some embodiments, the encrypted electronic message is stored in the memory 110. In other embodiments, the encrypted electronic is sent via a wireless communication method to the purchaser to store in a memory of the purchaser's choosing. By storing the encrypted electronic message in the memory 110 or by sending the encrypted electronic message to the purchaser without saving a copy of the encrypted electronic message, the manufacturer of the electronic controller 100 is not required to store the electronic message with the information about the installation of the secret key on an external computing system. This allows for the purchaser of the electronic controller 100 who is security conscious to keep the electronic message with the information about the installation of the secret key stored in the memory 110 or in another memory. In the event that the manufacturer's external computing system is compromised, the electronic message with valuable information (such as a UID or installation information) is not compromised, as the electronic message is stored away from the external computing system in the memory 110 or in another memory.

The electronic message is accessed at block 225 by the purchaser (or another user) from the memory 110 if issues arise with the electronic controller 100. For example, if the electronic controller 100 experiences a failure, the purchaser of the electronic controller 100 may wish to access the electronic message to examine the installation information, especially in a case where the purchaser of the electronic controller 100 is disputing with the manufacturer of the electronic controller 100 which of the two are at fault for the failure of the electronic controller 100.

In order to examine the installation information, the purchaser of the electronic controller 100 must decrypt the electronic message stored in the memory 110 (at block 230). The purchaser has a private key for decrypting the electronic message based upon the public key associated with the purchaser that was used to encrypt the electronic message after the installation of the secret key. The purchaser uses the electronic controller 100, in one embodiment, to decrypt the electronic message using the private key. In another embodiment, the purchaser uses an external computing system connected to the electronic controller 100 (via the input-output interface 115 and/or the HMI 120) to decrypt the electronic message using the private key. Once the purchaser has utilized the private key to decrypt the electronic message, the electronic message is passed on to the manufacturer.

The manufacturer of the electronic controller 100 receives the decrypted electronic message from the purchaser of the electronic controller 100. In order to verify that the purchaser of the electronic controller 100 has not tampered with or falsified the information included with the electronic message, the manufacturer utilizes a manufacturer public key in order to validate and confirm the digital signature, at block 235. By confirming the digital signature with the manufacturer public key, the manufacturer guarantees that the electronic message has not been tampered with, and can therefore trust the information contained within the electronic message to accurately reflect the installation of the secret key. The manufacturer, in one embodiment, requests not only the electronic message but also the electronic controller 100 in order to perform the validation and confirmation of the digital signature. The manufacturer uses, in one embodiment, the HMI 120 in order to interface with the electronic controller 100 to confirm the digital signature. In another embodiment, the manufacturer connects an external computing system to the electronic controller 100 via the input-output interface 115 in order to confirm the digital signature.

In response to the confirmation of the digital signature, the electronic controller 100 is configured to generate a confirmation message at block 240. The confirmation message includes, in one embodiment, the confirmation of the digital signature by the manufacturer as performed at block 235. In another embodiment, the confirmation message includes a failure message indicating the digital signature could not be confirmed. Other embodiments may include either the confirmed digital signature or the failure message and other data, such as the other contents of the electronic message. The signed message and all associated data and messages are incorporated in the confirmation message in some embodiments.

The generated confirmation message is then sent to a user at block 245. In one embodiment, the user is the manufacturer of the electronic controller 100. The manufacturer receives the confirmation message including the confirmed digital signature. If the manufacturer receives the confirmed digital signature with the confirmation message, the manufacturer can trust the information provided by the electronic message indicating an installation status of the secret key (e.g., the key was installed correctly and thus the manufacturer is not at fault for a failure of the electronic controller 100). If the manufacturer receives the failure message, the manufacturer knows that the electronic message has been tampered with, and the manufacturer can return to a purchaser with the evidence that the electronic message has been tampered with.

Thus, embodiments provided herein disclose, among other things, systems and methods for confirming a cryptographic key.

Various features, advantages, and embodiments are set forth in the following claims.

What is claimed is:

1. A system for confirming a cryptographic key, the system comprising:
   an electronic controller configured to
      generate an electronic message in response to an installation of a secret key on the electronic controller, the electronic message comprising information about the installation of the secret key,
      digitally sign the electronic message using a manufacturer private key,
      encrypt the electronic message using a public key of a purchaser of the electronic controller,
      store the electronic message in a memory specified by the purchaser of the electronic controller,
      access the stored electronic message in response to a request by a user,
      decrypt the electronic message using a private key of the purchaser,
      confirm a digital signature of the electronic message using a manufacturer public key,
      generate a confirmation message, wherein contents of the confirmation message are generated based upon the confirmation of the digital signature, and
      send the confirmation message to a user.

2. The system of claim 1, the electronic controller further configured to generate an authentication electronic message.

3. The system of claim 2, wherein the authentication electronic message comprises a message authentication code.

4. The system of claim 2, wherein the electronic controller is further configured to encrypt the authentication electronic message.

5. The system of claim 1, wherein the information regarding the installation of the secret key includes a notification.

6. The system of claim 1, wherein the electronic message further comprises linking information for the electronic controller.

7. The system of claim 6, wherein the linking information includes at least one of a serial number and a time of production.

8. The system of claim 7, wherein the electronic controller is further configured to encrypt and digitally sign the linking information.

9. The system of claim 1, wherein the electronic controller comprises an electronic processor, an input and output interface, and the memory the electronic message is stored into.

10. The system of claim 1, wherein the electronic message further comprises information encrypted to only the manufacturer of the electronic controller.

11. A method for confirming a cryptographic key, the method comprising:
   generating, with the electronic controller, an electronic message comprising information regarding an installation of a secret key on the electronic controller;
   digitally signing, with the electronic controller, the electronic message using a manufacturer private key;
   encrypting, with the electronic controller, the electronic message using a public key of a purchaser of the electronic controller;
   storing, with the electronic controller, the electronic message in a memory specified by the purchaser of the electronic controller;
   accessing, with the electronic controller, the electronic message from the memory in response to an input by a user;
   decrypting, with the electronic controller, the electronic message using a private key of the purchaser;
   confirming, with the electronic controller, a digital signature of the electronic message using a manufacturer public key;
   generating, with the electronic controller, a confirmation message, wherein contents of the confirmation message are generated based upon the confirmation of the digital signature, and
   sending, with the electronic controller, the confirmation message to a user.

12. The method of claim 11, the method further comprising generating, with the electronic controller, an authentication electronic message.

13. The method of claim 12, wherein the authentication electronic message comprises a message authentication code.

14. The method of claim 12, the method further comprising encrypting, with the electronic controller, the authentication electronic message.

15. The method of claim 11, wherein the information regarding the installation of the secret key includes a notification.

16. The method of claim 11, wherein the electronic message further comprises linking information for the electronic controller.

17. The method of claim 16, wherein the linking information includes at least one of a serial number and a time of production.

18. The method of claim 17, the method further comprising encrypting and digitally signing the linking information.

19. The method of claim 11, wherein the electronic controller comprises an electronic processor, an input and output interface, and the memory the electronic message is stored into.

20. The method of claim 11, wherein the electronic message further comprises information encrypted to only the manufacturer of the electronic controller.

* * * * *